A. L. PLATTE.
SLED.
APPLICATION FILED MAY 24, 1921.

1,408,029.

Patented Feb. 28, 1922.

Inventor
A. L. Platte

UNITED STATES PATENT OFFICE.

ALBERT L. PLATTE, OF CLINTON, ILLINOIS.

SLED.

1,408,029.　　　　　　Specification of Letters Patent.　　Patented Feb. 28, 1922.

Application filed May 24, 1921. Serial No. 472,048.

*To all whom it may concern:*

Be it known that I, ALBERT L. PLATTE, a citizen of the United States of America, residing at Clinton, in the county of De Witt and State of Illinois, have invented certain new and useful Improvements in Sleds, of which the following is a specification, reference being had therein to the accompanying drawing.

The invention relates to sleds and has for its object to provide a device of this character comprising a pair of sled runners having superimposed thereon a horizontally disposed operator's seat, and to provide means comprising a pivoted lever and a ground engaging lever whereby upon an oscillation of the pivoted lever the ground engaging lever may be utilized for propelling the sled.

A further object is to so construct the ground engaging lever and the pivoted lever that said ground engaging lever may be utilized as a brake for bringing the sled to a sudden or gradual stop.

A further object is to provide a centrally disposed pivoted runner adjacent the forward end of the sled, said runner being provided with a transversely disposed foot engaging member by means of which the sled may be steered during its movement.

A further object is to provide propelling means for a sled so constructed that a movement simulating bucking or jumping may be imparted to the sled by a quick operation of the propelling means.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1:
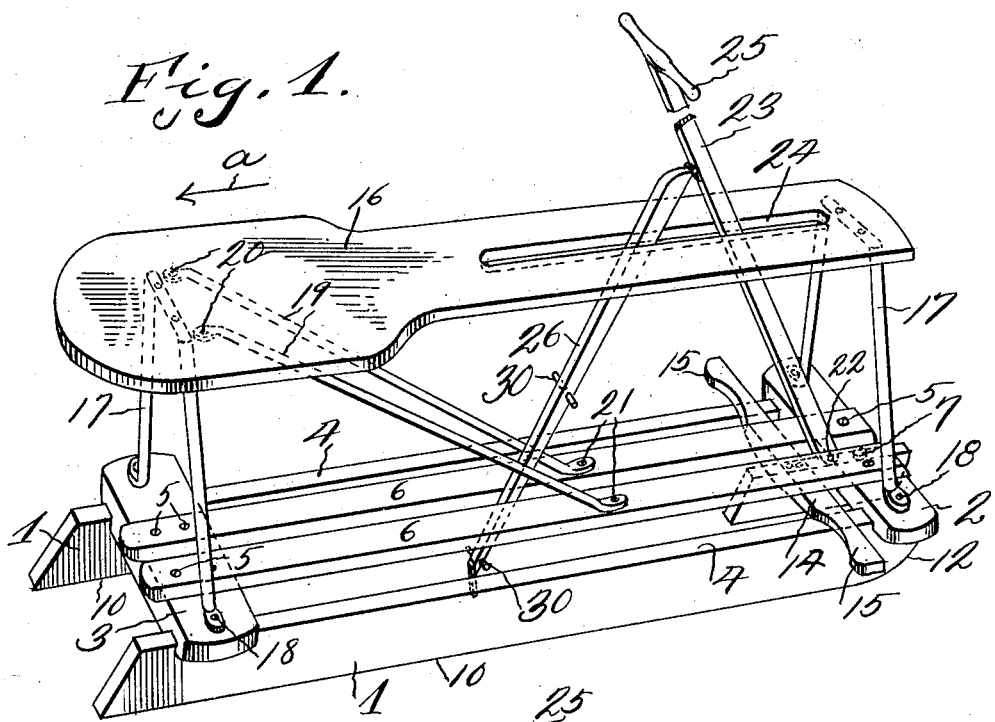
Figure 1 is a perspective view of the sled.

Referring to the drawings, the numeral 1 designates spaced parallel sled runners, and 2 and 3 transversely disposed bars for securing said runners 1 together at their forward and rear ends. Bars 2 and 3 have their upper faces disposed above the upper edges 4 of the runners 1, and secured on the upper faces of the bars 2 and 3 by means of screws 5 are longitudinally disposed spaced bars 6. Pivotally connected at 7 to the transversely disposed bars 2 is a centrally disposed guide runner 8, which runner has its lower edge 9 disposed below the lower edges 10 of the runners 1, so that it will bite into the snow or ice, and its forward curved edge 11 extending forwardly of the forward curved edges 12 of the runners 1, and on to which curved edge 11 the sled will ride during a braking operation hereinafter set forth, and also during a bucking or jumping operation hereinafter set forth. Secured to the upper edge of the runner 8 by means of rivets 13 is a transversely disposed foot engaging bar 14, the ends 15 of which extend beyond the outer sides of the runners 1 and are adapted to be engaged by the feet of the operator when seated on the seat 16. It will be seen that by having the upper faces of the transversely disposed bars 2 and 3 above the upper edges 4 of the runners 1 that sufficient space is provided to allow the ends 15 of the bar 14 to extend outwardly from beneath the longitudinally disposed bars 6.

Figure 2:
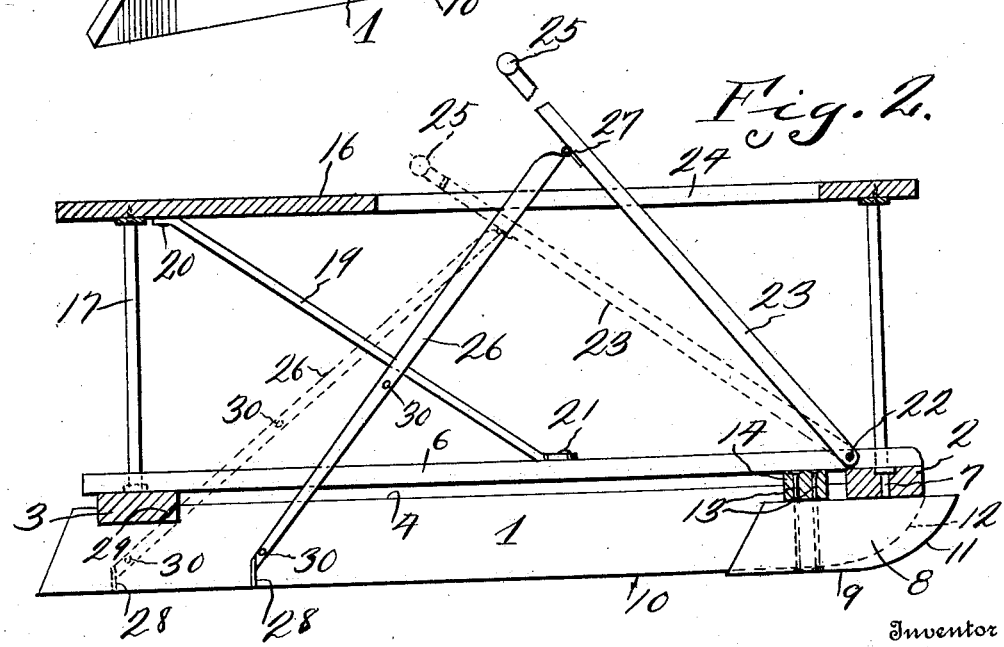
Figure 2 is a vertical longitudinal sectional view through the sled.

The operator's seat 16 is supported on U-shaped brackets 17, the arms of which are secured at 18 to the transversely disposed bars 2 and 3. During the operation of the propelling mechanism considerable rearward strain in the direction of the arrow *a* is imparted on the seat 16, therefore to brace the seat against this rearward strain forwardly and downwardly extending brace bars 19 are provided, which brace bars are secured at 20 to the seat 16 and at 21 to the longitudinally disposed bars 6. Pivotally mounted at 22 between the forward ends of the bars 6 is an upwardly extending operating lever 23, which operating lever extends upwardly through an elongated slot 24 in the operator's seat 16 and terminates in a transversely disposed handle 25. When the operator is occupying the seat 16 he grasps the handle 25 and oscillates the lever 23. As the oscillating lever 23 is moved rearwardly the ground engaging arm 26 which is pivoted at 27 to the lever 23 is also forced rearwardly with the ground engaging end 28 in engagement with the ground thereby causing the sled to be propelled forwardly. It will be seen that by a continued oscillation of the lever 23 that the sled may be propelled and that by varying the speed of oscillation that the speed of the sled will also be varied. During the propelling operation, if it is desired to suddenly stop the sled the operator may release the handle 25 thereby allowing the ground engaging arm 26 to move rearwardly to the position shown in Figure 2, at which time the sled will ride up at the rear end thereof on the ground engaging arm 26, and force the ground engaging element 28 into the ground or ice, which action will cause the sled to come to a quick stop. It is obvious that during the braking operation, the lever 23 may be so manipulated as to allow the ground engaging arm 26 to so engage the recessed portion 29 of the transversely disposed bar 3 as to only have a slight braking action on the momentum of the sled. The ground engaging element 26 is provided with spaced pins 30, one of which pins is located on each side of the longitudinally disposed bars 6 and prevents the ground engaging arm 26 becoming displaced from between said bars or for moving too far rearwardly during a braking operation.

When it is desired to make the sled jump clear of the ground or to simulate bucking the ground engaging arm 26 is moved well forwardly with its free end in engagement with the ground and a vigorous pull imparted on the same through the medium of the operating lever 23, which action will cause the sled as a whole to be forced upwardly clear of the ground on the ground engaging element as a fulcrum on excessive pulls and be forced upwardly at its rear end on pulls of medium power.

From the above it will be seen that a sled is provided which may be easily propelled by the operator and one so constructed that a jumping or bucking operation may be simulated through the propelling mechanism. By disposing the arm 26 between the longitudinal disposed bars 6, it will be seen that the arm 26 will be braced against side movement and also guided during its movement between the bars.

The invention having been set forth what is claimed as new and useful is:—

A sled comprising spaced runners in parallel relation to each other, the spaced runners being connected together adjacent their ends by transversely disposed bars, longitudinally disposed bars superimposed on the transversely disposed bars and spaced above the upper edges of the runners, a centrally disposed guide runner pivoted to the forward transversely disposed bar, a foot engaging bar carried by the guide runner and extending outwardly from beneath the longitudinally disposed bars and overlying the upper edges of the runners, a seat supported by brackets carried by the transversely disposed bars and provided with a longitudinally disposed slot, an operating lever pivoted between the forward ends of the longitudinally disposed bars and extending upwardly through the elongated slot in the seat and a ground engaging arm pivoted to the operating lever and extending downwardly through the slot in the seat and having its free end extending through the space between the longitudinally disposed bars.

In testimony whereof I hereunto affix my signature.

ALBERT L. PLATTE.